UNITED STATES PATENT OFFICE.

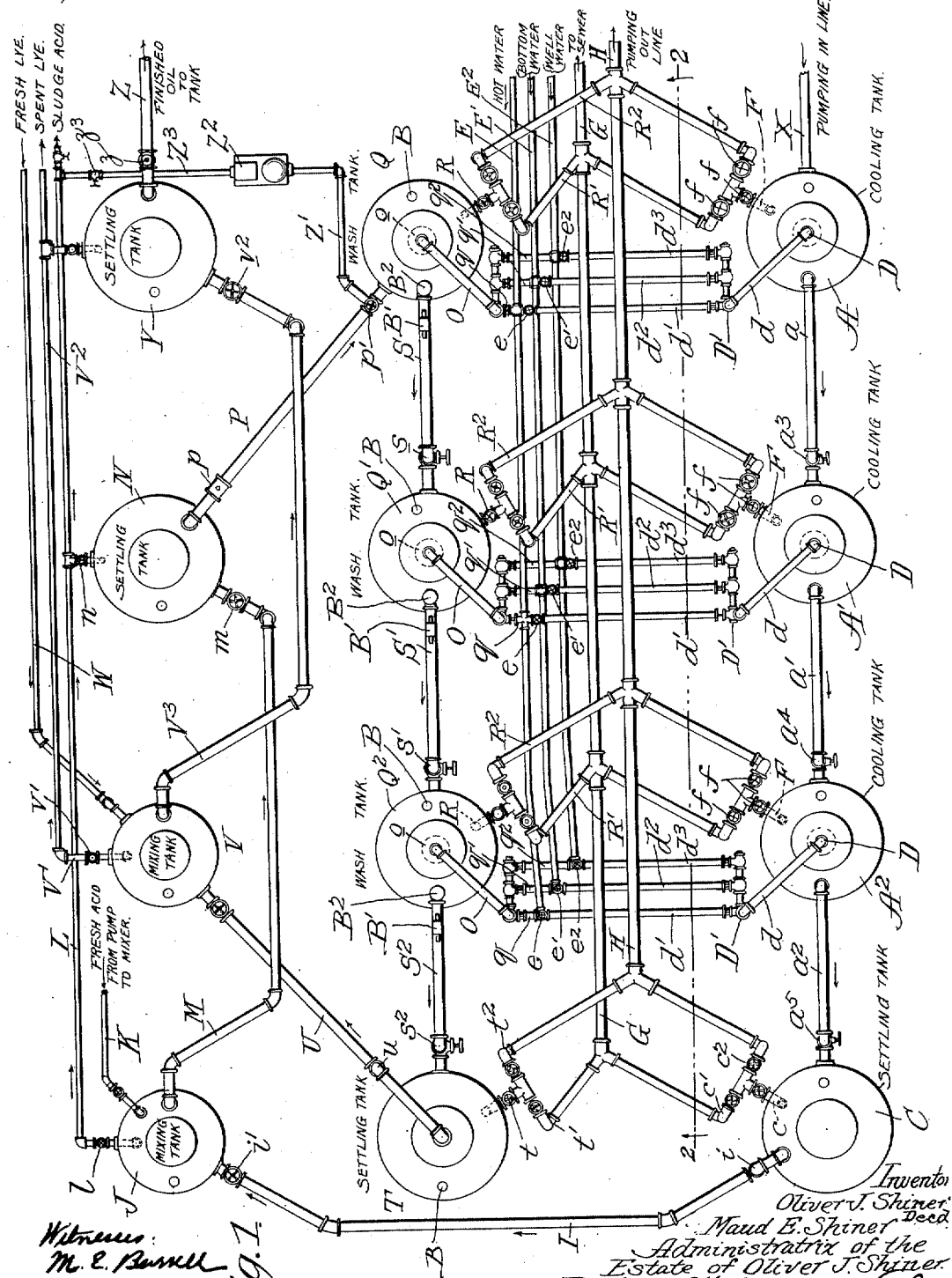

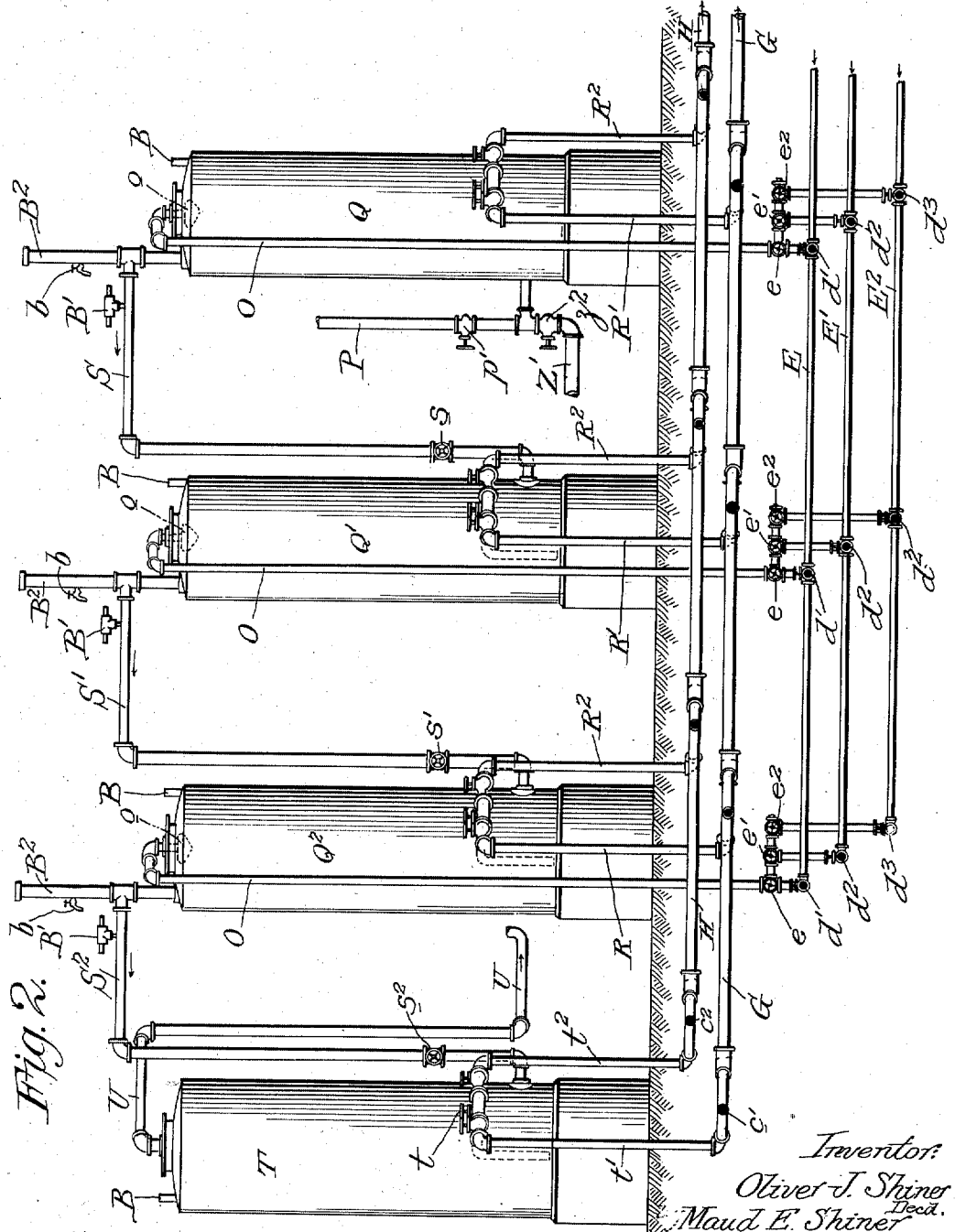

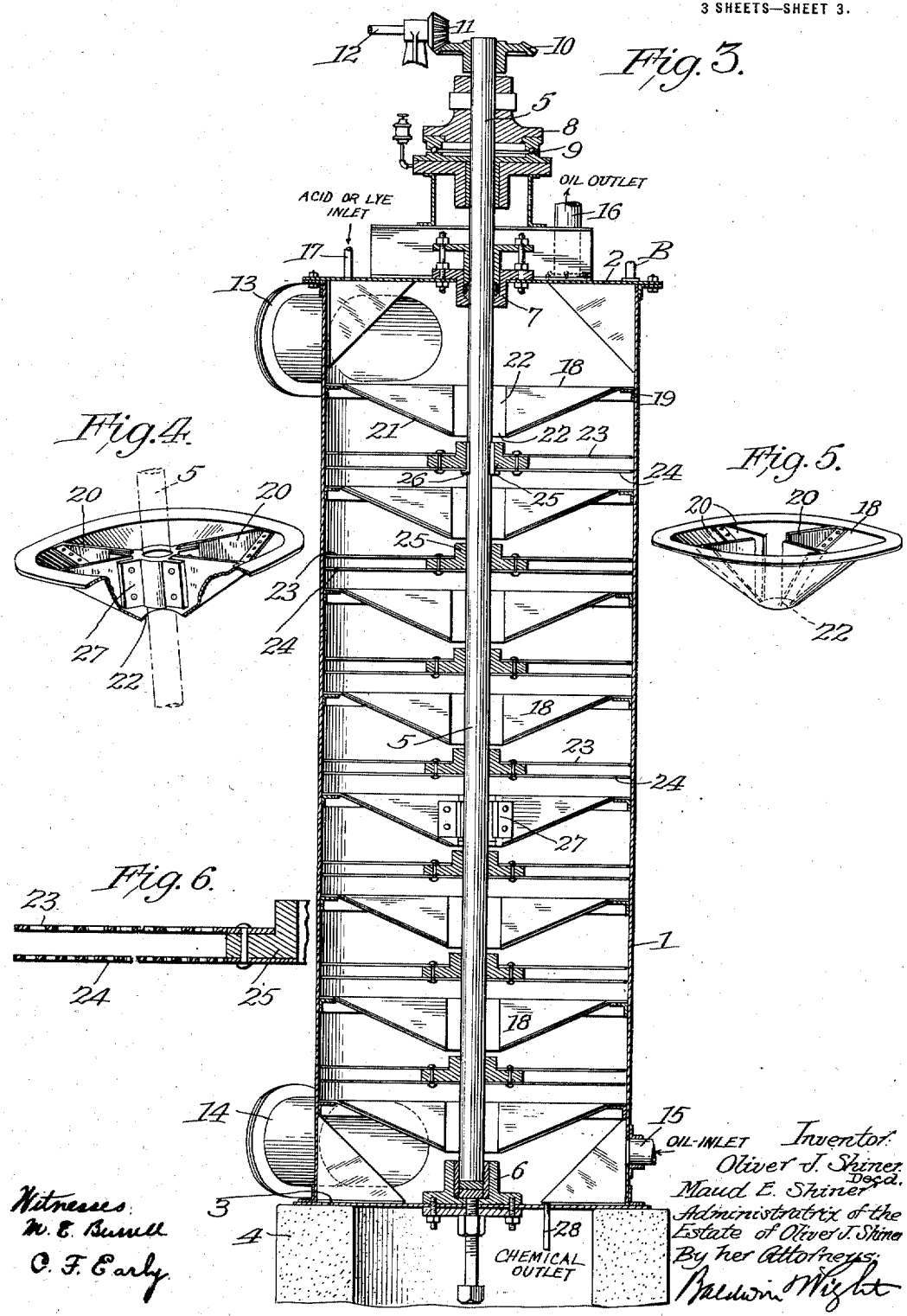

OLIVER J. SHINER, DECEASED, LATE OF BAYONNE, NEW JERSEY, BY MAUD E. SHINER, ADMINISTRATRIX, OF BAYONNE, NEW JERSEY, ASSIGNOR OF TWENTY-FIVE ONE-HUNDREDTHS TO THOMAS A. MURPHY, OF BAYONNE, NEW JERSEY, AND FORTY-NINE ONE-HUNDREDTHS TO LLOYD B. WIGHT, OF WASHINGTON, DISTRICT OF COLUMBIA, AND EDWARD C. DAVIDSON, OF ELIZABETH, NEW JERSEY; MARIE A. DAVIDSON, ADMINISTRATRIX OF SAID EDWARD C. DAVIDSON, DECEASED, ASSIGNOR TO MARIE A. DAVIDSON, INDIVIDUALLY, OF ELIZABETH, NEW JERSEY.

APPARATUS FOR PURIFYING OIL.

1,203,419.   Specification of Letters Patent.   Patented Oct. 31, 1916.

Application filed May 1, 1913. Serial No. 764,970.

*To all whom it may concern:*

Be it known that OLIVER J. SHINER, late a citizen of the United States, residing in Bayonne, in the county of Hudson and State of New Jersey, invented certain new and useful Improvements in Apparatus for Purifying Oil, of which the following is a specification.

This invention relates to apparatus of the kind shown in U. S. Patent No. 1,099,622, dated June 9, 1914 which shows and describes a process of and apparatus for purifying oil similar to that herein shown and described. Claims for the process and claims to some features of the apparatus are made in said patent. The claims of the application for the present patent are confined to certain details of the apparatus which will be hereinafter specified.

In the accompanying drawings illustrating the invention, Figure 1 is a diagram of the apparatus for purifying oils constructed in accordance with this invention. Fig. 2 shows a section on the line 2—2 of Fig. 1 and illustrates the washing tanks and some of their pipe connections. Fig. 3 shows a vertical central section through one of the mixers forming part of the apparatus. Figs. 4, 5, and 6 are detail views of parts of the mixer.

The apparatus employed preferably comprises twelve tanks,—three tanks in which the oil is cooled or heated to bring it to the required temperature, three tanks for washing purposes, four settling tanks, and two mixing tanks. The cooling or heating tanks A, A', A² are arranged in series, as shown, oil being pumped into the bottom of tank A at X, filling this tank and flowing from the top of the tank through the pipe $a$ to the bottom of tank A' in which tank it rises, overflows through the pipe $a'$ and enters the bottom of tank A² which tank it fills and overflows at the top through the pipe $a^2$ and enters the bottom of the settling tank C. The pipes $a$, $a'$, and $a^2$ are provided with valves $a^3$, $a^4$, $a^5$, and each tank is provided with a water-spraying device D which is connected by a pipe $d$ with a manifold D', which manifold is connected by pipes $d'$, $d^2$, $d^3$ with the hot water supply pipe E, the supply pipe E' for bottom water and the supply pipe E² for well water. The bottom water referred to comes from the bottom of the tanks A, A', A² and is stored in a suitable receptacle and afterward brought in by pipes, as indicated in Fig. 1, and may be used for modifying the temperature of the oil in said tanks. This bottom water is supplied at a temperature of about 62° F. Each of the pipes $d$, $d'$, $d^2$ is provided with suitable valves $e$, $e'$, $e^2$. By operating these valves the spraying device D may be supplied with hot water, bottom water or well water, or a mixture of these waters, as may be required for the purpose of obtaining the desired temperature in the oil. Each of the tanks A, A', A² is in like manner connected with the pipes E, E', E² and each of said tanks A, A', A² is provided with a drain pipe F in the bottom for carrying off water and delivering it to a sewer pipe G. Said pipe F is also connected with a pumping-out line H. The drain pipe F is connected with said pipes G and H in the manner clearly indicated in the drawings, valves $f$ being employed to control the flow of liquid to either the pipe G or the pipe H. Each of the tanks A, A', A² is in like manner connected with the pipes G and H. The oil continuously flows from the pipe X to and through the several tanks A, A', A² where it acquires the desired temperature and it then passes to the settling tank C where any water that may still cling to the oil descends or is held at the bottom while the oil rises and passes out at the top through a pipe I which leads to a mixing tank J, the details of construction of which are shown in Figs. 3, 4, 5, and 6, and will be hereinafter more fully described. The pipe I is provided with valves $i$, $i'$, as shown. The number and sizes of the cooling or heating tanks and the number and sizes of the settling tanks employed may vary at different seasons of the year or in the treatment of different oils, naphtha, etc. It will be understood that water of the proper temperature is supplied continuously through the spraying devices D and it comes in contact with the continuously flowing oil, the water being heavier descends and passes the constantly rising oil. In the summer time the temperature of the oil entering the cooling tanks is usually about 85° F. By treating the oil in the several cooling tanks with water at a temperature of say 60° F. the oil may have its temperature gradually reduced to about 60° F. The temperature of the oil varies at different times and under different conditions and the temperature of the water should be correspondingly varied in order to bring the oil to a temperature of about 60° F. before it is subjected to the acid treatment.

The cooling tanks A, A′, A² and the settling tank C are all closed air-tight and are joined by air-tight connections. The water admitted to the cooling tanks and which descends to the bottom thereof flows continuously to the sewer, the flow being regulated by suitable valves. The water settling in the tank C is drawn therefrom and passed to the sewer as often as required, gages being employed to show the water level. It will be understood that the pumping-out line H is for the purpose of emptying the tanks throughout the system of oil when repairs are necessary and for other like purposes, and normally this pumping-out line H is not in use, but is only employed occasionally.

Fresh acid preferably 66° Baumé from a suitable pump or other device for supplying acid under pressure is conveyed by a pipe K to the top of the mixer J and is mixed with oil in the manner hereinafter described. The acid passes downwardly through the oil and is drawn off as often as required through a pipe L provided with a valve $l$ and it is conveyed as sludge-acid to any suitable receptacle. The oil which rises to the top of the mixer passes by means of a pipe M provided with a valve $m$ to the bottom of a settling tank N where it is separated from any acid which may cling to it, said acid settling to the bottom and being drawn off when required through a valved pipe $n$ and passed to the pipe L which conveys it to any suitable receptacle for sludge-acid. The oil which continually rises in the tank N passes out through the top thereof through a pipe P provided with a check valve $p$ and it enters the lower portion of a washing tank Q which is supplied with either hot water, bottom water, well water, or a mixture thereof through the pipes $q$, $q′$, $q²$, said supply being controlled by the valves $e$, $e′$, $e²$. Each set of pipes $q$, $q′$, $q²$ connects with a pipe O provided with a spraying device $o$. The first wash tank Q should be lead lined because the oil has commingled with it some weak acid which would attack an iron tank, and furthermore the oil is cooled or maintained at a relatively low temperature in the tank Q for a similar purpose, i. e., so that the metal tank shall not be attacked by the weak acid in the said tank. There are two other wash tanks Q′, Q², which are supplied with water from the pipes E, E′, E² in a similar way and each of said tanks Q, Q′, Q² is provided with a discharge pipe R connected by pipes R′, R² with the pipe G which leads to the sewer or to the pipe H through which oil may be pumped when emptying the system. The water supplied to the tanks Q, Q′, Q² in the normal operation of the apparatus passes continuously through the pipe connections described to the sewer. The flow of the water may be regulated by the valves shown.

Suitable air inlet valves are applied to the tanks where required. In Fig. 2 such valves are shown at B and the other tanks in the system may be provided with such valves. The connecting pipes may, if necessary be equipped with air inlet valves as indicated at B′ in Fig. 2. Such valves are necessary when emptying the system through the pumping-out line H, but when oil is being pumped through the tanks, such valves are, of course, closed. The tanks where required may be provided with air chambers B² as indicated in Fig. 2. These, as shown in Fig. 2, are connected with the pipes S, S′ and S². The air in the tanks and pipes when the system is being filled with oil, for the most part, passes out at the delivery end of the system, but some air lingers and such air will be forced up into air chambers, such as indicated at B², and the air pressure may be relieved, if necessary, from time to time, by means of air-relief cocks $b$.

The oil after being washed in the tank Q passes out from the top thereof and flows by means of the pipe S having a valve $s$ to the bottom of the tank Q′ in which it rises and passes out from the top through a pipe S′ having a valve $s′$ and enters the bottom of the tank Q² where it rises and flows out from the top through a pipe S² having a valve $s²$ and then enters the bottom of the settling tank T. It will be understood that the oil is washed as it flows through the tanks Q, Q′, Q² and the temperature of the oil may be gradually raised by employing well water, bottom water, hot water, or a combination thereof, as required. Preferably the temperature of the water admitted to the first tank Q is 64° F.; that admitted to the second tank Q is 75° F., and that admitted to the third tank $Q^2$ is 85° F. In this way the oil is raised to the temperature best fitted for the alkali treatment. In the settling tank T the oil is separated from any water which may pass over from the wash tanks with it, such water collecting at the bottom and being drawn off to the sewer pipe G as often as required. The tank T is connected by means of the valved pipes $t$, $t'$, $t^2$ with the pipes G and H, and when the system is being emptied the valves may be so operated as to connect the tank T with the pumping-out line H. In this connection it will be observed that the settling tank C is provided with valved pipes $c$, $c'$, $c^2$ connecting with the sewer pipe G and the pumping-out line H.

The oil separated from the wash-water flows out from the top of the settling tank T through a pipe U having valves $u$, $u'$ and enters the bottom of another mixing tank V similar to the tank J hereinbefore referred to. Fresh lye preferably 9° Baumé is supplied under pressure through the pipe W to the top of the tank V and flows down through said tank meeting the oil rising therein and being thoroughly mixed with said oil in the manner hereinafter described. The bottom of the tank V is connected by a pipe V' having a valve $v'$ with a pipe $V^2$ through which the spent lye flows continuously during the normal operation of the apparatus, the flow being regulated by the valve $v'$. The oil passes out through the top of the tank V through a pipe $V^3$ having a valve $v^2$ and enters the bottom of the settling tank Y which tank is also connected to the pipe $V^2$ through which spent lye is delivered as often as required. The purified or finished oil passes from the top of the tank Y through a pipe Z having a valve $z$ to any suitable receptacle. Where naphtha is being treated it is not necessary to further treat it with clay in the manner hereinbefore referred to, but the naphtha when it issues from the pipe Z is ready for final distillation and is then ready for the market. If kerosene is being purified, a further treatment with clay is necessary.

As before specified, all of the twelve tanks are closed air-tight and are supplied with suitable gages, vacuum valves, etc. The check valve $p$ is for the purpose of preventing water from passing from the tank Q to the settling tank N in case of accident, as where the supply of water or the pressure of water may exceed the pressure of oil, this valve $p$ permits the oil to flow freely, as indicated by the arrow in Fig. 1, but it will close if the liquid tends to flow in the opposite direction.

The pipe P, as indicated in Fig. 2, is provided with a valve $p'$ and this pipe connects with a pipe Z', as indicated in Fig. 2. This pipe Z' also connects with a pump $Z^2$ which latter is connected by a pipe $Z^3$ with the pipe L. The pipe $Z^3$ is provided with a valve $z^3$ as indicated in Fig. 1. The pipe L, it will be observed, connects with the tanks J and N so that by closing the valve $p'$ the flow of oil to the wash tank Q may be stopped and the acid-water in the tank Q may be transferred to the pipe L or oil from the mixer J and tank N may be transferred to and put through the tank Q by means of the pump $Z^2$. In this way the acid may be washed out of the oil and this oil may be pumped out and transferred to a suitable receptacle when emptying the system. When it is desired to stop the operation and entirely empty the pipes, the water and chemicals are first withdrawn from the tanks in the manner before described and then the pumping-out line H is connected by means of the valves, before referred to, with the tanks and said tanks may be emptied of the oil which they contain, the vacuum valves, before referred to, assisting in the emptying of the tanks in a well known way.

The fact that this process may be carried on continuously is largely due to the use of mixers for bringing the acid and oil and the alkali and oil into intimate contact with each other and in a sub-divided or atomized condition. It is largely for this reason that the periods of settling heretofore necessary are avoided.

The mixing apparatus, which is preferably employed, and which in practice has been found to be most efficient is illustrated particularly in Fig. 3 of the drawings to which reference is now invited. This mixing apparatus comprises a cylinder 1 standing vertically, closed at opposite ends by heads 2, 3, and resting on any suitable foundation 4. Centrally arranged within the cylinder is a vertical shaft 5 resting in bearings 6 at its lower end and passing through a stuffing box 7 carried by the upper head 2. The shaft 5 also passes through a shaft mounting 8 which may be provided with ball-bearings 9 and at its upper end the shaft carries a beveled pinion 10 meshing with a corresponding pinion 11 on a driving shaft 12. The cylinder 1 is provided with man-holes 13 and 14 and it is equipped in its side near its lower end with an inlet 15 for oil and at the top with an outlet 16 for oil. It is also provided with an inlet 17 at the top for acid or lye. Otherwise the container may be of any suitable construction. Within the cylinder 1 is arranged a vertical series of pans 18. These have a general conical shape being of the general construction shown in Figs. 4 and 5. Each of the pans 18 is secured at its periphery 19 to the side wall of the cylinder 1 in any suitable way and it is divided preferably into four pockets by means of radial partitions 20. The pan is open at the top and has a sloping bottom 21 provided with a central opening 22 surrounding the shaft 5. The pans 18 are spaced apart, as shown, and between each two pans are arranged perforated plates 23, 24. Each pair of plates is attached to a hub 25 secured to and revolving with the shaft 5. One means of securing the hub 25 to the shaft is indicated at 26. These plates, which are circular and correspond in form with the interior diameter of the cylinder 1, extend close to the walls of the cylinder without touching it, being free to revolve within the cylinder. The upper plate 23 of each pair of plates is perforated preferably with ¼ inch holes preferably spaced one inch between centers and the bottom plate 24 of each pair is preferably perforated with ⅛ inch holes preferably spaced ½ inch between centers. All of the plates are similarly constructed and are arranged as clearly shown in Fig. 3 of the drawings.

In order to provide a bearing for the shaft 5, about midway between the upper and lower ends of the cylinder 1, one of the pans is provided with a hub 27 which is attached to the partitions 20 in the manner shown in Fig. 4. This provides means for steadying the shaft 5 and is desirable inasmuch as the mixer may be of considerable height. The oil, which enters at 15, passes up through the openings 22 of the several pans 18 while the acid or lye, which enters at 17, descends through the oil to the bottom of the mixer and flows out at 28. The oil passes up through the openings 22 in the pans 18 and then up through the perforated plates. The acid or lye first enters the uppermost pan 18, passes down through the opening 22 of this pan and is received by the uppermost pair of plates 23, 24. Each pan serves to carry the chemicals into the center of the mixer and drop them down onto the revolving plates which throw them out by centrifugal force toward the shell of the mixer, and the oil, naphtha or other liquid being treated passes up through the center of the pan while the chemicals are passing down through said openings and are at this time being mixed.

This apparatus insures an intimate mixture of the chemicals with the oil, the particles being thoroughly atomized and for this reason the flow of oil through the mixer may be made continuous. It is largely due to the use of mixers of the kind described that the process may be performed continuously.

It will be observed that the tanks are all closed air-tight so that danger from fire is reduced to a minimum. The easily volatile gases are saved, whereas in the old method many of these gases were lost because the agitators employed were not closed air-tight. Furthermore by this continuous method there is a large saving of acid because when the oil and acid are passing through the mixer there is a thorough mixing of the two liquids, whereas in the old system the acid does not come in contact with every particle of the oil and it is necessary to use a relatively large amount of acid to obtain the desired results.

A process and apparatus have been described especially intended for use in treating oils, but other liquids, such as naphtha, may be treated in the same way. So much of an oil treating system as is necessary to give a clear understanding of the present invention has been described and shown. It is to be understood that some of the parts of the apparatus are of well known construction and need no specific illustration or description.

What is herein claimed as the invention of the said OLIVER J. SHINER, is,

1. In an apparatus for purifying oil the combination of a mixer in which the oil receives an acid treatment, means for supplying acid thereto, a settling tank to which the acid-treated oil passes from the mixer, a pipe for sludge-acid having valved connections with the mixer and the settling tank, a wash tank, a pipe connecting the top of the settling tank with the bottom of the wash tank, a valve in said pipe for closing communication between the settling tank and the wash tank, a valved pipe connecting the wash tank with the sludge-acid pipe, and a pump connected with said last-mentioned pipe, the organization being such that in the normal operation of the apparatus acid-treated oil may pass from the settling tank to the wash tank but by closing the valve between the settling tank and the wash tank and opening communication between the wash tank and the sludge-acid pipe oil may be drawn from the mixer and the settling tank into said wash tank or the acid water in the wash tank may be transferred to the sludge-acid pipe.

2. In an apparatus for purifying oil the combination of a series of closed tanks for chemically treating the oil and for washing it, pipes connecting the several tanks for conveying oil continuously through them, means for supplying purifying agents to some of the tanks, air inlet valves applied to the top of said tanks, and a pumping-out line connected with the tanks for opening the valves and emptying the tanks of oil.

3. In an apparatus for purifying oil the combination of a series of tanks in which the oil is washed and chemically treated, pipes connecting said tanks in series for conveying oil continuously through them, means for supplying water to some of the tanks to wash the oil, means for supplying chemicals to other tanks in the series, pipes for drawing off water from the bottom of the wash tanks, pipes for drawing off chemicals from the bottoms of other tanks in the series, air inlet valves on the tanks, and a pumping-out line connected with the tanks for emptying them of oil after the water and chemicals have been withdrawn therefrom.

In testimony whereof I have hereunto subscribed my name this 30th day of April 1913.

MAUD E. SHINER,

*Administratrix of the estate of Oliver J. Shiner, deceased.*

Witnesses:
JOHN F. O'NEILL,
W. J. FLANAGAN.

Copies of this patent may be obtained for five cents each, by addressing the "Commissioner of Patents, Washington, D. C."

Correction in Letters Patent No. 1,203,419.

It is hereby certified that in Letters Patent No. 1,203,419, granted October 31, 1916, upon the application of Oliver J. Shiner, deceased, late of Bayonne, New Jersey, for an improvement in "Apparatus for Purifying Oil," an error appears requiring correction as follows: In the grant, lines 10-11, and in the heading to the printed specification, lines 5-6, for "Marie A. Davidson, Administratrix" read *Marie A. Davidson, Executrix;* and that the said Letters Patent should be read with this correction therein that the same may conform to the record of the case in the Patent Office.

Signed and sealed this 28th day of November, A. D., 1916.

[SEAL.]

F. W. H. CLAY,
*Acting Commissioner of Patents.*

Cl. 196—29.